US008523461B2

(12) United States Patent
Yoshikawa et al.

(10) Patent No.: US 8,523,461 B2
(45) Date of Patent: Sep. 3, 2013

(54) OPTICAL TRANSCEIVER HAVING INNER METAL COVER

(75) Inventors: Satoshi Yoshikawa, Yokohama (JP); Yuuichi Kitajima, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 235 days.

(21) Appl. No.: 13/046,309

(22) Filed: Mar. 11, 2011

(65) Prior Publication Data
US 2011/0222822 A1  Sep. 15, 2011

(30) Foreign Application Priority Data

Mar. 12, 2010 (JP) ................................. 2010-056297
Oct. 1, 2010 (JP) ................................. 2010-224151

(51) Int. Cl.
*G02B 6/36* (2006.01)

(52) U.S. Cl.
USPC .................................. 385/92; 385/88; 385/89

(58) Field of Classification Search
USPC .......................................................... 385/92
See application file for complete search history.

(56) References Cited

U.S. PATENT DOCUMENTS

| 6,659,655 | B2 * | 12/2003 | Dair et al. ........................ 385/92 |
| 6,863,448 | B2 * | 3/2005 | Chiu et al. ....................... 385/88 |
| 7,416,353 | B2 | 8/2008 | Yoshikawa et al. |
| 2005/0286839 | A1 * | 12/2005 | Yoshikawa ....................... 385/92 |
| 2006/0093287 | A1 * | 5/2006 | Yoshikawa et al. ............. 385/92 |
| 2009/0269077 | A1 * | 10/2009 | Sone et al. ...................... 398/135 |

* cited by examiner

*Primary Examiner* — Ryan Lepisto
(74) *Attorney, Agent, or Firm* — Venable LLP; Michael A. Sartori; Tamatane J. Aga

(57) ABSTRACT

An optical transceiver that provides an inner metal cover in addition to a metal cover and a frame is disclosed. The inner cover includes a ceiling, a front skirt bent downward at a front edge of the ceiling, sides bent downward at both side edges of the ceiling, and a pair of arms extending rearward from respective side ends of the ceiling. The ceiling makes an obtuse angle with respect to the front skirt when the arms are not assembled with the frame, and shapes in convex protruding outward when the metal cover is not assembled with frame and. Assembling the inner cover and the metal cover with the frame, the inner cover comes in securely contact with the metal cover.

8 Claims, 12 Drawing Sheets

OPTICAL TRANSCEIVER HAVING INNER METAL COVER

BACKGROUND OF THE INVENTION

1. Field of the Invention

The present invention relates to an optical transceiver, in particular, the invention relates to an optical transceiver that enhances the EMI shielding.

2. Related Prior Art

One type of the optical transceiver is well known and called as the hot pluggable optical transceiver, in which the transceiver is set within a cage prepared in the host system without turning off the power supply of the system. Such an optical transceiver provides an electrical plug in the rear end thereof, which is mated with the electrical connector prepared in the deep end of the cage; thus the communication between the optical transceiver and the host system may be established. The optical transceiver also provides an optical receptacle in the front end thereof, into which an external optical connector may be inserted. The United States Patent issued as U.S. Pat. No. 7,416,353 has disclosed such optical transceiver. The EMI shielding becomes further important as the operational speed of the optical transceiver reaches and sometimes exceeds 10 GHz.

SUMMARY OF THE INVENTION

The optical transceiver according to one aspect of the present invention comprises an optical subassembly (hereafter denoted as OSA), an optical receptacle, a frame, an inner cover, and a metal cover. The OSA includes a sleeve and a package. The optical receptacle receives an external optical connector that secures an optical fiber optically coupled with the optical subassembly. The frame provides a bottom to mount the package of the optical subassembly and side walls each rising from respective edges of the bottom. The inner cover, which is made of metal, includes a ceiling that extends between the side walls of the frame and covers the housing of the optical subassembly. The metal cover, which is assembled with the frame, covers and comes in contact to the inner cover, One feature of the optical transceiver of the present invention is that the ceiling of the inner cover shapes in convex, that is, it protrudes outward between the side walls when the metal cover is not assembled with the frame, and the metal cover is once assembled therewith, the metal cover may securely push the inner cover downward toward the bottom of the frame.

The inner cover may further provide a front skirt put between the optical receptacle and the frame. The ceiling makes an obtuse angle with respect to the front skirt when only the front skirt is set between the optical receptacle and the frame and the ceiling is not set between the arms. Thus, when the inner cover is fully assembled with the frame, the front skirt may securely come in contact with the optical receptacle with leaving substantially no gaps therebetween.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Next, some preferred embodiments according to the present invention will be described as referring to accompanying drawings. In the description of the drawings, the same numerals or the symbols will refer to the same elements without overlapping explanations.

Figure 1:
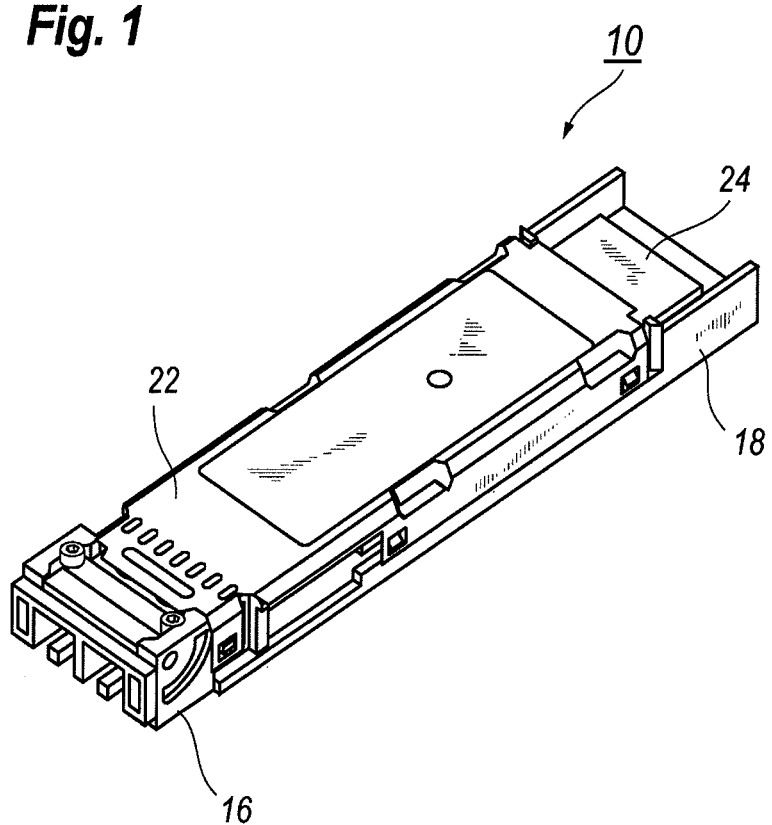
FIG. 1 is a perspective view of an optical transceiver according to an embodiment of the present invention.
Figure 2:
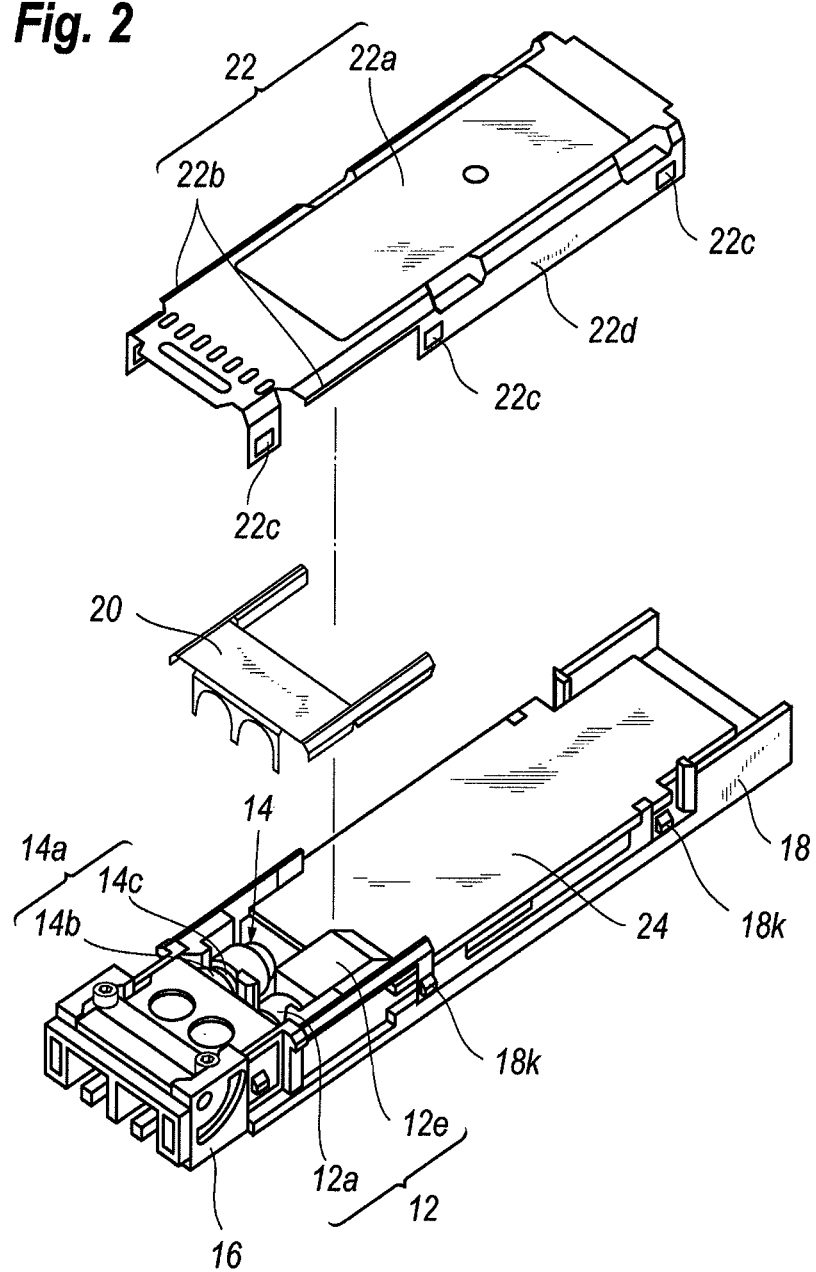
FIG. 2 is an exploded view of the optical transceiver illustrated in FIG. 1.

FIG. 1 is a perspective view of the optical transceiver according to one embodiment of the present invention; and FIG. 2 is an exploded view thereof. The optical transceiver 10 illustrated in FIGS. 1 and 2 has an arrangement following, what is called as the XFP transceiver whose specifications are determined by the multi source agreement. The character "X" means ten (10) in Roman numerals and the operational speed of the XFP transceiver reaches 10 Gbps in the standard. The optical transceiver 10 is implemented within the host system. Specifically, a rear part behind the optical receptacle is set within the cage of the host system as the electrical plug 24 provided in the rear end is mated with the electrical connector provided in the deep end of the cage; while, the optical receptacle in the front end thereof exposes from the port provided in the face plate of the host system to be mated with the external optical connector.

The optical transceiver 10 further provides a transmitter optical subassembly (hereafter denoted as TOSA) 12, a receiver optical subassembly (hereafter denoted as ROSA) 14, the optical receptacle 16, the frame 18, an inner cover 20, a printed circuit board (hereafter denoted as PCB) 24, and a metal cover 22. The description below assumes the direction of the frame 18 with respect to the optical receptacle 16 as the rear, while, the direction opposite thereto as the front. Moreover, the upper side is assumed to be a direction of the cover 22 with respect to the frame 18, while the lower side is opposite thereto.

The TOSA 12 may emit signal light by receiving an electrical signal from the circuit on the PCB 24. The TOSA 12 may include a semiconductor laser diode (hereafter denoted as LD), a package that encloses the LD, and a cylindrical sleeve 12a. The sleeve 12a may receive the optical fiber secured in the external optical connector to couple the LD optically with the optical fiber. The sleeve 12a provides two flanges and a neck between flanges.

The ROSA 14 may convert an optical signal provided from the optical fiber in the external optical connector into an electrical signal and transmits this electrical signal to the circuit on the PCB 24. The ROSA 14 may include a photodiode (hereafter denoted as PD), a package to enclose the PD, and a cylindrical sleeve 14a. The sleeve 14a may receive the optical fiber secured in the external optical connector to couple the PD optically with the optical fiber. The sleeve 14a provides a flange 14b and a neck 14c behind the flange 14b. The neck 14c has a diameter smaller than that of the flange 14b.

Figure 3:
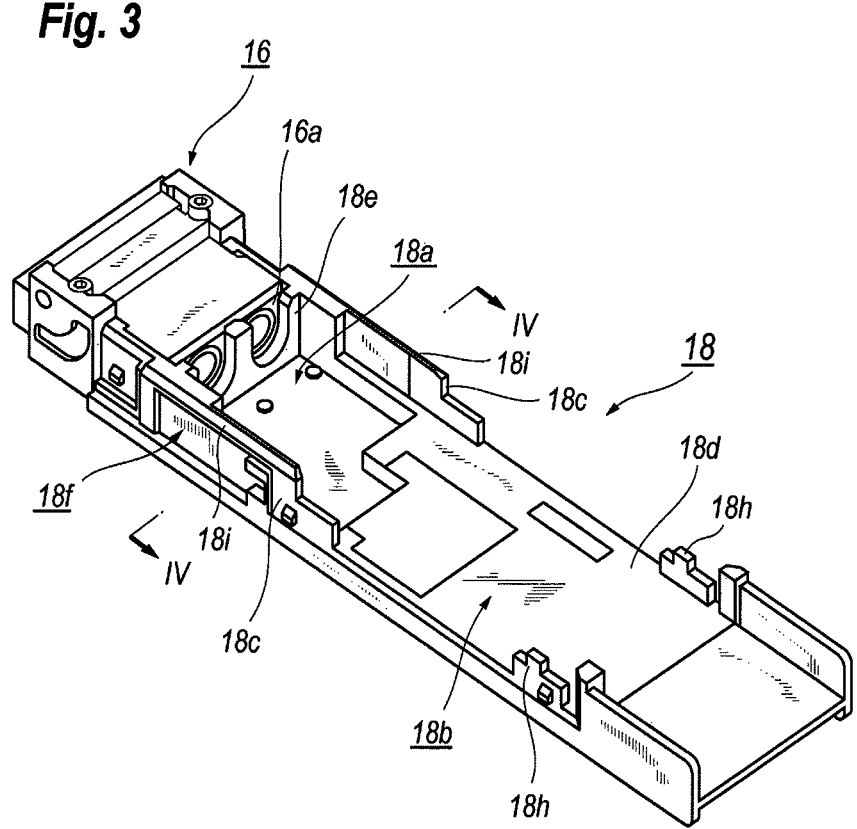
FIG. 3 is a perspective view of a frame and an optical receptacle implemented within the optical transceiver shown in FIG. 1.

The TOSA 12 and the ROSA 14 are mounted on the frame 18. FIG. 3 is a perspective view showing the frame 18 and the optical receptacle 16. The optical transceiver 10, as shown in FIG. 3, distinguishes the optical receptacle 16 from the frame 18. That is, the optical receptacle 16 and the frame 18 are formed independently. However, two members, 16 and 18, may be integrally formed.

The optical receptacle 16 is a member to couple the TOSA 12 and the ROSA 14 optically with the external optical fiber. That is, the optical receptacle 16, which may be coated in surfaces thereof with electrically conductive material, for instance, the optical receptacle 16 may be made of metal die-casting, or resin coated with meal film. The optical receptacle 16 provides two spaces that receive an end of the TOSA sleeve 12a and an end of the ROSA sleeve 14a. The external optical connected is inserted into the space from the front side and may couple optically with the TOSA sleeve 12a and the ROSA sleeve 14a.

The optical receptacle 16 provides a rear wall 16a where two openings are formed toward two spaces of the optical receptacle 16. The end of the TOSA sleeve 12a and the end of the ROSA sleeve 16a are protruded within the spaces through these openings. The frame 18 is set in the rear of the optical receptacle 16. The frame 18, which is made of metal, provides an area 18a to mount the OSAs, 12 and 14, and another area 18b in the rear of the former area 18a to mount the PCB 24. The frame 18 provides two side walls 18c and a bottom 18d. The side wall 18c, which faces to each other, puts the bottom 18d therebetween.

The frame 18a provides a front wall 18e in a front side of the area 18a to mount the OSAs. The front wall 18e has two saddles that mount the neck in the TOSA sleeve 12a and that of the ROSA sleeve 14a. Two flanges of the TOSA sleeve 12a put this saddle therebetween, while the flange 14b of the ROSA sleeve 14a is set between the front wall 18e of the frame 18 and the rear wall 16a of the optical receptacle 16. Thus, the position of the TOSA 12 and that of the ROSA 14 with respect to the optical receptacle 16 may be automatically determined. When the two members, 16 and 18, are integrally formed, the flange of the TOSA 12 and that of the ROSA 14 abut against the rear wall 16a of the receptacle to determine the positions of the OSAs automatically.

The area 18a to mount OSAs is lowered from the area 18b for mounting the PCB 24. That is, the former area 18a forms a hollow. The TOSA 12 has a rectangular package 12e, as shown in FIG. 1, to configure, what is called as the butterfly module. The bottom of the package 12e comes thermally in contact with the bottom of the area 18a through, for instance, a thermal sheet to secure a heat-dissipating path from the package 12e to the frame 18. The side wall 18c rises at the each side of the area 18a. As described later, a top of the side wall 18c forms a bulge which is coupled with the inner cover 20. The outer side of the side wall 18c provides a hollow 18f extending longitudinally that may guide the optical transceiver 10 at the insertion into the cage of the host system.

The other area 18b to mount the PCB 24 forms a terrace. Electrical components mounted on the PCB 24 may come in thermally contact to the bottom 18d of the area 18b. The components may be in contact with the bottom 18d through, for instance, a thermal sheet to secure the heat dissipating path from the circuit to the frame 18. The area 18b may further provide projection 18h extending upward, which may set the PCB 24 in the position on the frame 18. The projection may receive stress applied to the PCB 24 when the transceiver 10 is mated with the electrical connector in the host system.

Figure 4:
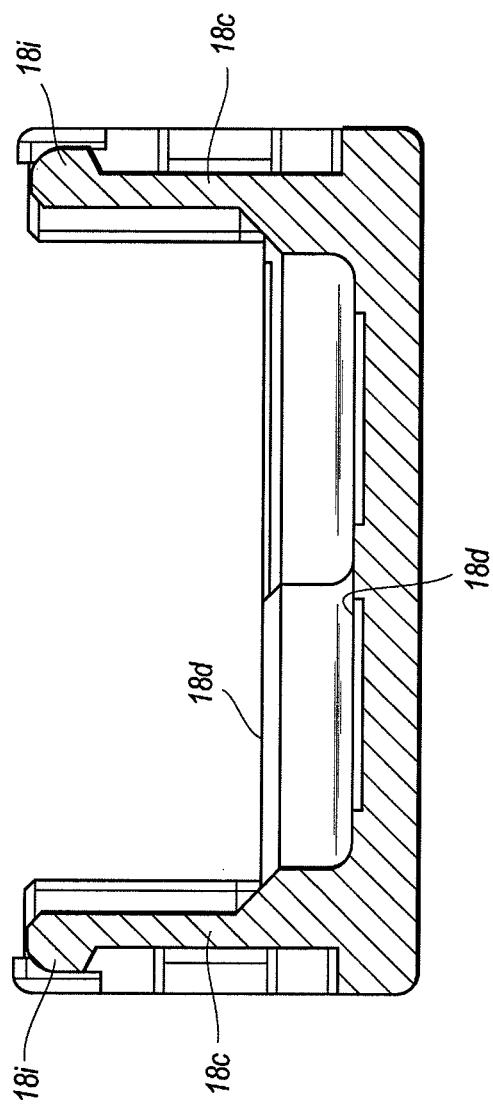
FIG. 4 is a cross section taken along the line IV-IV appeared in FIG. 3.

FIG. 4 is a cross section taken along the ling IV-IV appeared in FIG. 3. The bottom 18d in the area 18a for mounting the OSAs is lowered compared to the bottom 18d in the area 18b for the PCB 24. The optical axis of the TOSA 12 and that of the ROSA 14 may be aligned with the optical axis of the external optical connector by hollowing the bottom of the area 18a. Moreover, the package 12e of the TOSA 12, which installs a heat-generating device such as thermo-electric controller (TEC), may be come in thermally contact to the bottom 18d through the thermal sheet.

Figure 5:
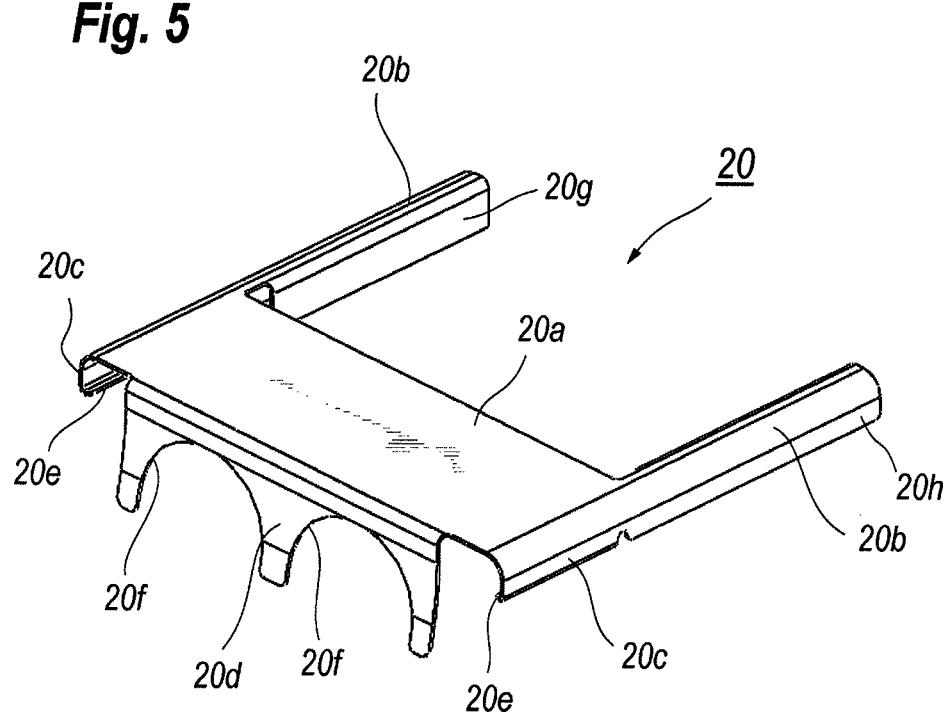
FIG. 5 is a perspective drawing of an inner cover viewed from the front top.
Figure 6:
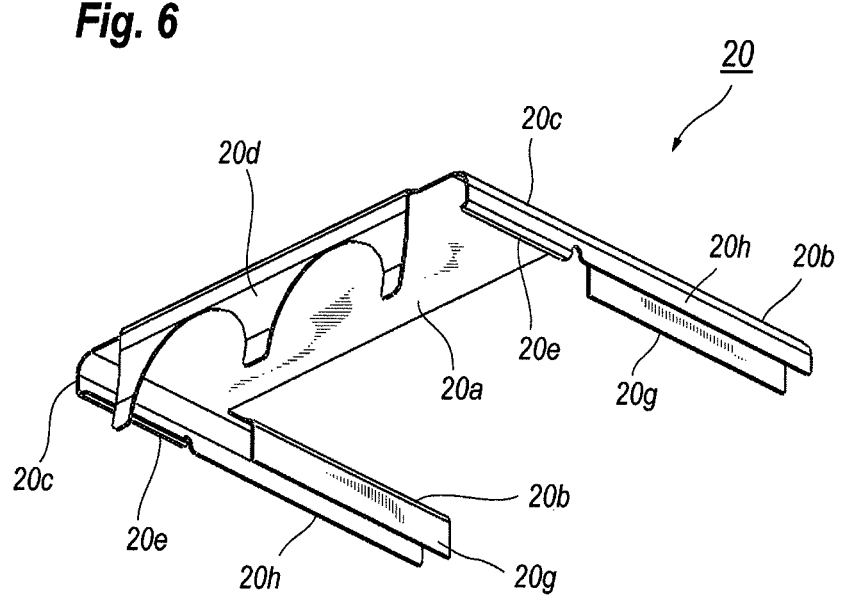
FIG. 6 is a perspective drawing of the inner cover viewed from front bottom.
Figure 7:
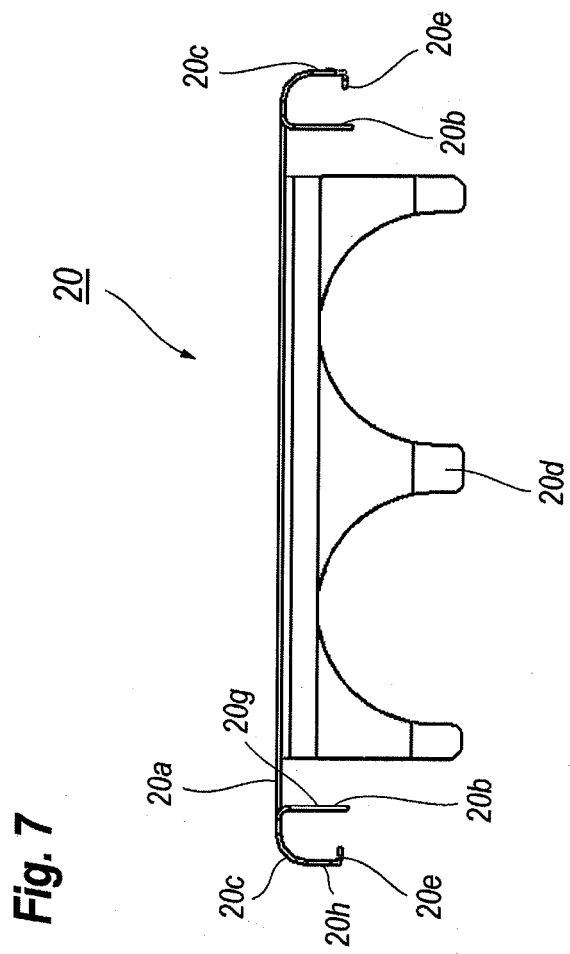
FIG. 7 is a front view of the inner cover.
Figure 8A:
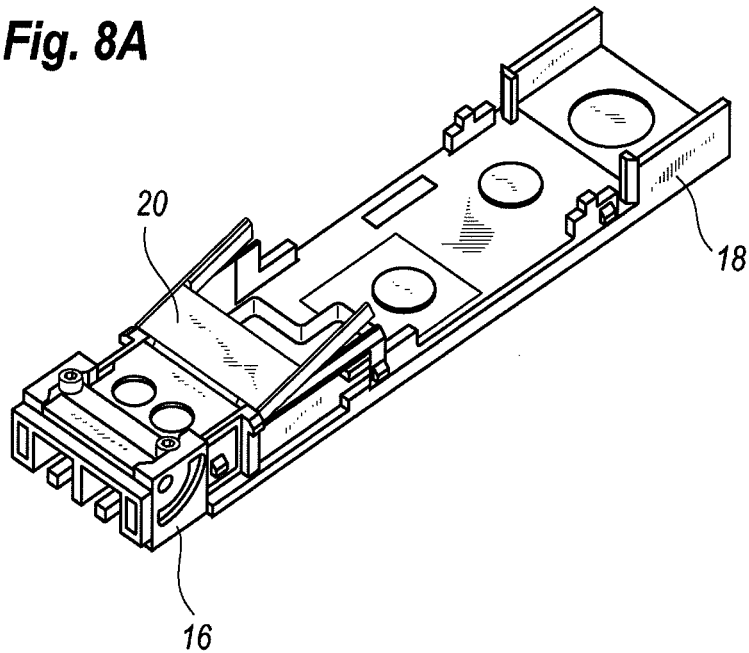
FIG. 8A shows a state when the inner cover is set between the optical receptacle and the frame but the arms thereof are not assembled with the frame.
Figure 8B:
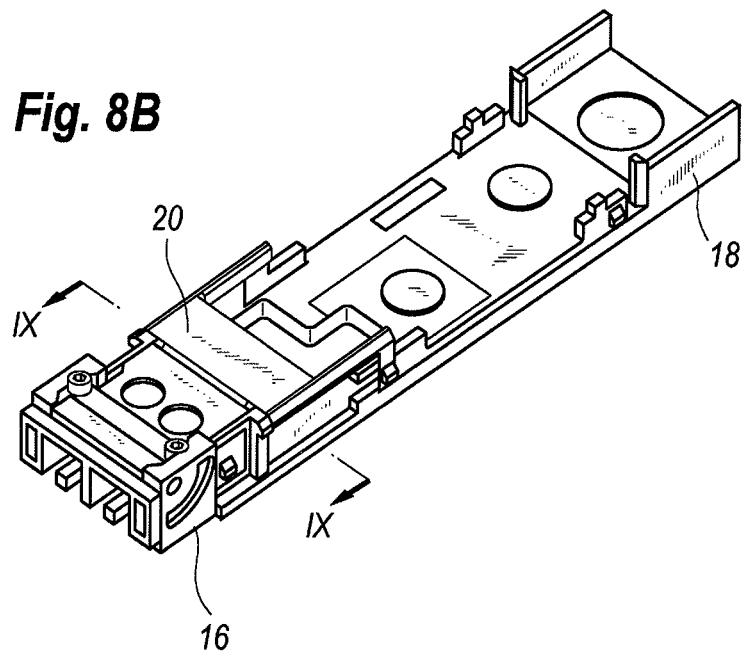
FIG. 8B shows ,a state when the arms are hooked with the bulge of the side walls of the frame.

FIGS. 5 and 6 are perspective views of the inner cover 20, where FIG. 5 vies the inner cover 20 from the front, while, FIG. 6 views the member from the rear. FIG. 7 is a front view of the inner cover 20, while, FIGS. 8A and 8B are views where the inner cover 20 is going to be assembled with the frame 18 (FIG. 8A), and the member 20 is assembled with the frame 18.

The inner cover 20 is assembled with the frame 18 so as to cover the area 18a for the OSAs. The member 20 may be formed by a metal plate only by cutting and bending without welding or soldering, which makes the member 20 inexpensive. As shown in FIGS. 5 to 7, the inner cover 20 comprises a ceiling 20a, a pair of arms 20b, a pair of sides 20c, and a front skirt 20d. The ceiling 20a is flat. The side 20c may be formed by bending the side end of the ceiling 20a downward. The arm 20b extends rearward from the rear end of the ceiling 20a. The embodiment of the member 20 extends the arm 20b from the rear end of the side 20c. The front skirt 20d may be formed by bending the front end of the ceiling 20a downward.

The cross section of the arm 20b is a U-shape but the direction thereof is upside down. Specifically, the arm 20b provides two clips, 20g and 20h, facing to the others. When the inner cover 20 is assembled with the frame 18, these two clips, 20g and 20h, put the side wall 18c of the frame 18 therebetween. The side 20c has a shape tracing the outer clip 20h of the arm 20b and is formed by bending the ceiling 20a downward. The side 20c is further bent inward in a tip thereof to form a hook 20e. When the inner cover 20 is assembled with the frame 18, the hook 20e may be latched with the bulge 18i in the top of the side wall 18c of the frame 18.

The front skirt 20d provides two arched cut 20f with a semicircular shape. The front skirt 20d is set into a gap between the front wall 18e of the frame and the rear wall 16e of the optical receptacle 16. The optical transceiver 10 of the present embodiment provides the frame 18 with the saddles in the front wall 18e thereof. The saddle combined with the arched cut 20f of the inner cover 20 may form apertures through which the TOSA sleeve 12a and the ROSA sleeve 14a pass. The arched cur 20f has a diameter slightly greater than a diameter of the flange of the TOSA sleeve 12a and that of the ROSA sleeve 14a; accordingly, the front skirt 20d of the inner cover 20 may be free from the flange of the TOSA sleeve 12a, that of the ROSA sleeve 14a, and the saddle of the front wall 16e. Thus, the optical axis of the TOSA sleeve 12a and that of the ROSA sleeve 14a may be not misaligned with the optical axes of the receptacle 16.

As shown in FIG. 8A, the front skirt 20d makes an obtuse angle to the ceiling 20a when the inner cover 20 is not fully assembled with the frame 18. FIG. 8A illustrates a status when only the front skirt 20d is put between the rear wall 16a of the optical receptacle 16 and the front wall 18e of the frame 18; and the ceiling 20a and two arms 20b are free from the frame 18. The angle between the front skirt 20d and the ceiling 20a may be, for instance, 90 to 120 degrees.

As shown in FIG. 8B, mating the arm 20b with the side wall 18c in the top thereof and latching the hook 20e with the bulge 18i, the angle between the front skirt 20d and the ceiling 20a is reduced close to a right angle. Concurrently, the front skirt 20d pushes the rear wall 16a frontward, which makes the front skirt 20d securely in contact to the rear wall 16a without forming a gap therebetween.

Figure 9:
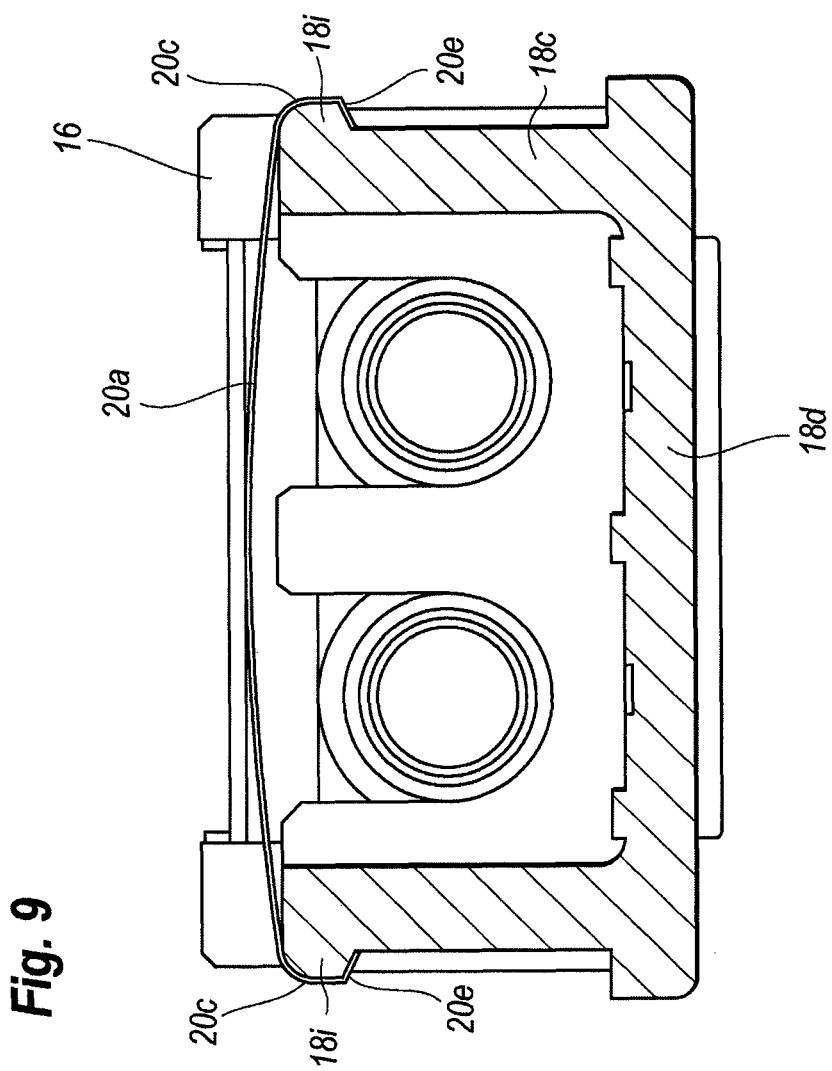
FIG. 9 is a cross section taken along the ling IX-IX in FIG. 8.

FIG. 9 is a cross section taken along the line IX-IX appeared in FIG. 8B. The arms 20b have a span therebetween slightly larger than a span between the side walls 18c when the inner cover 20 is not assembled with the frame 18. Assembling the inner cover 20 with he frame 18 by latching the hook 20e with the bulge 18i, the ceiling 20a rises in a center thereof upward as shown in FIG. 9 and the ceiling 20a makes a convex surface. Then, the metal cover 22 is set in the frame 18 so as to enclose the inner cover 20.

The cover 22 may be also formed by a metal sheet only by cutting and bending without welding or soldering. As illustrated in FIG. 2, the cover 22 includes a top 22a, a pair of girders 22b, and a pair of sides 22d. The top 22a covers two areas, 18a and 18b, and the inner cover 20. The side 22d provides an opening 22c engaged with a projection 18k provided in the side wall 18c of the frame 18, which may assembles the cover 22 with the frame 18. The girder 22b is arranged outside of the side 20c and the outer clip 20h of the arm 20b so as to put the side wall 18c therebetween.

Assembling the cover 22 with the frame 18, the top 22a of the cover 22 pushes the ceiling 20a of the inner cover 20 downward, which may come the cover 22 securely in contact with the inner cover 20 without forming a gap therebetween. Moreover, the inner cover 20 pushed downward by the cover 22 causes a transverse expansion of the member 20. However, the girders 22b in each side of the cover 22 may effectively prevent this transverse expansion of the inner cover 20.

Figure 10:
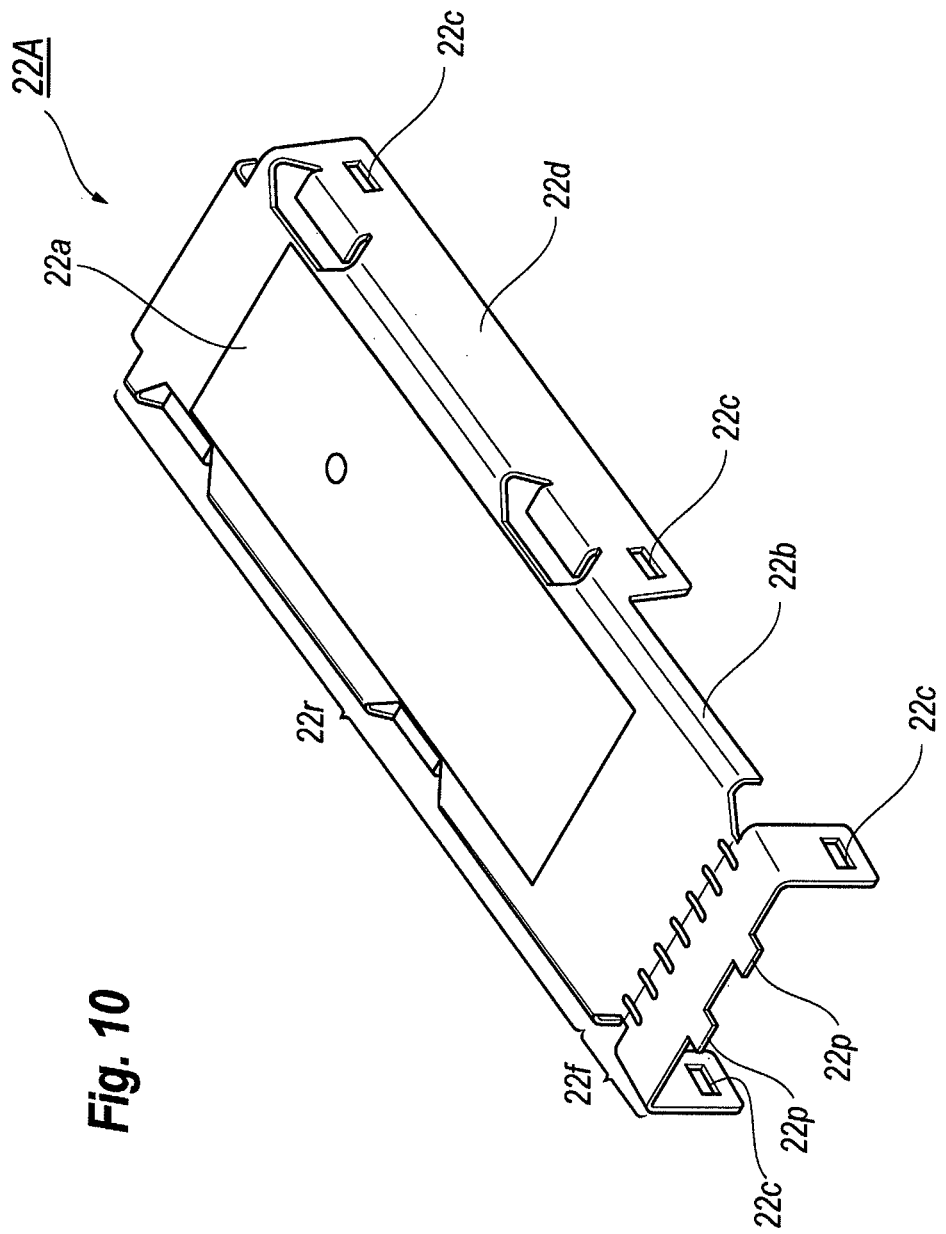
FIG. 10 shows a metal cover according to a modified embodiment of the invention.

Although the present invention has been fully described by the preferred embodiment thereof as referring to the accompanying drawings, it is to be understood that various changes and modifications may be apparent to those skilled in the art. FIG. 10 is a perspective view of a modified cover 22A, FIG. 11 is a side view thereof, and FIG. 12 is a perspective view of an optical receptacle 16A assembled with the frame 18.

Figure 11:
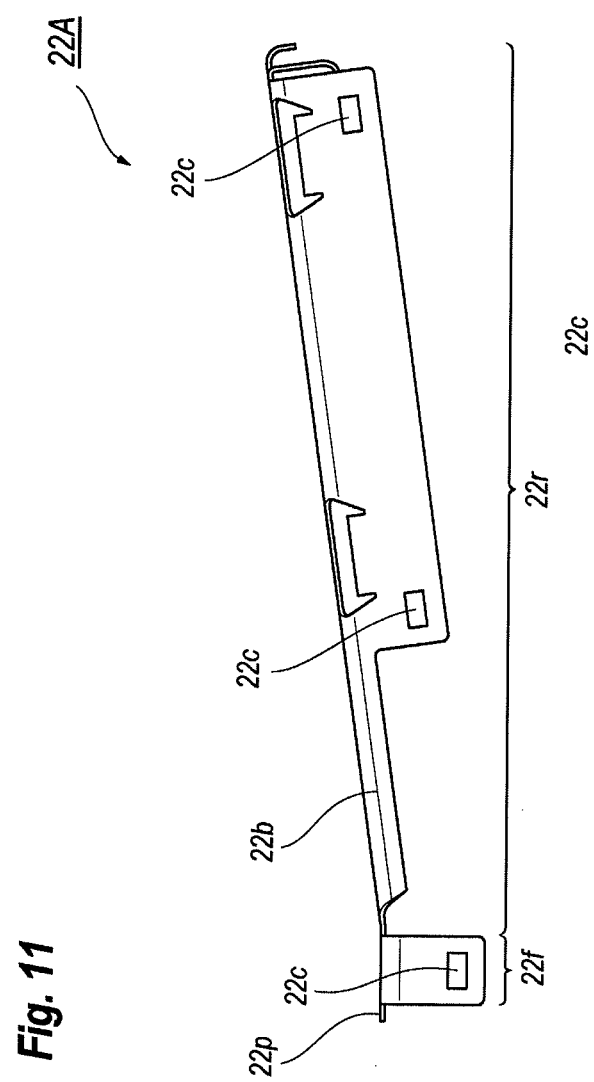
FIG. 11 is a side view of the modified metal cover shown in FIG. 10.

As illustrated in FIGS. 10 and 11, the modified cover 22A includes a front portion 22f and a rear portion 22r. The former portion 22f is assembled with the optical receptacle 16A, while, the latter portion 22r is assembled with the frame 18. The former cover 22 provides a flat top 22a, while, the modified cover 22A provides two portions, 22f and 22r, which make a substantial obtuse angle therebetween. That is, the top 22a in the front portion 22f makes an angle of, for instance 173±2° with respect to the top 22a in the rear portion 22r. The top 22a in the rear portion 22r is tilted upward by 7±2° with respect to the top 22a of the front portion 22f. Additionally, the top 22a of the front portion 22f in the front edge thereof protrudes two tabs 22p.

Figure 12:
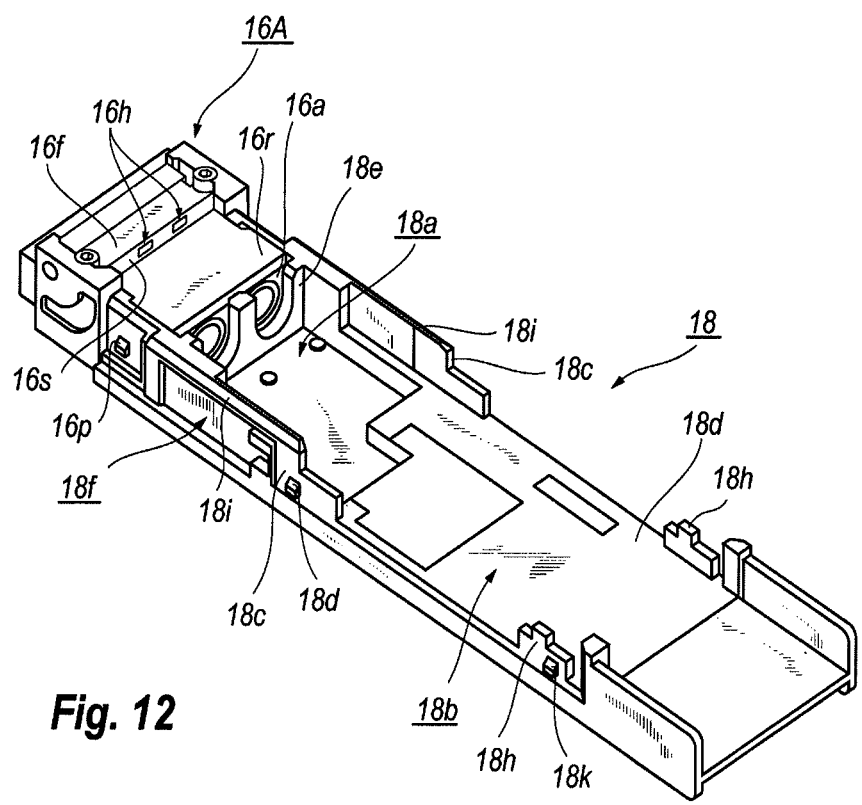
FIG. 12 is a perspective drawing of a modified optical receptacle to be assembled with the modified metal cover shown in FIG. 10.

As shown in FIG. 12, the modified optical receptacle 16A also includes a front portion 16f and a rear portion 16r, and a step 16s between two portions, 16f and 16r. The step 16s provides two openings 16h directing the front, into which the tabs 22p of the cover 22A are inserted. The cover 22A may be assembled with the optical receptacle 16A such that two tabs 16p are first inserted into the openings 16h and then the opening 22c in the front portion 22f of the cover 22A is going to be mated with the projection 16p provided in the side of the optical receptacle 16A. In this state, the rear portion 22r of the cover 22A rises from the frame 18.

Mating the opening 22c in the rear portion 22r with the projection 18k of the frame 18, the cover 22A may be securely assembled with the frame 18 and the optical receptacle 16a. In these arrangements of the cover 22A, the optical receptacle 16A and the frame 18; the cover 22A may further push the inner cover 20 downward compared to the arrangement of the cover 22 in the aforementioned embodiment. Because the tabs 22p of the cover 22A are inserted into the openings 16h, substantially no gaps may be formed between the ceiling 20a and the cover 22A even when the inner cover 20 lifts up the cover 22A. Thus, the optical transceiver according to the present embodiment may effectively enhance the EMI shielding. The embodiment shown in FIG. 12 provides two tabs 22p and two openings 16h. However, the number of tabs 22p and that of the holes 16h may be optional.

What is claimed is:

1. An optical transceiver, comprising:
   an optical subassembly that includes a sleeve and a package;
   an optical receptacle for receiving an external optical connector that secures an optical fiber optically coupled with said optical subassembly;
   a frame that provides a bottom and side walls, said bottom mounting said package of said optical subassembly, said side walls each rising from respective edges of said bottom;
   an inner cover made of metal, said inner cover including a ceiling and a pair of arms, said ceiling extending between said arms and assembled with said side walls of said frame to cover a housing of said optical subassembly mounted on said bottom of said frame, said arms extending rearward from said ceiling; and
   a metal cover assembled with said frame, said metal cover covering and being in contact to said inner cover,
   wherein said ceiling of said inner cover has a length greater than a width between said side walls such that said ceiling warps outwardly between said side walls of said frame to push said metal cover outwardly.

2. The optical transceiver of claim 1,
   wherein each of said arms provides an inner clip and an outer clip facing to each other, said inner clip and said outer clip forming a U-shaped cross section to receive said side wall of said frame therein.

3. The optical transceiver of claim 1,
   wherein said inner cover further includes a pair of sides each bent downward at respective edges of said ceiling, said sides extending between said sides of said frame.

4. The optical transceiver of claim 3,
   wherein each of said side walls has a bulge in a top thereof, and each of said sides of said inner cover has a hook bent inward at an end thereof,
   wherein said hook is latched to said bulge.

5. The optical transceiver of claim 1,
   wherein said frame has a front wall to set said sleeve of said optical subassembly thereon,
   wherein said inner cover further provides a front skirt inserted between said optical receptacle and said front wall of said frame, and wherein said front skirt pushes said optical receptacle frontward.

6. The optical transceiver of claim 5,
wherein said front skirt has an arched cut with a semicircular shape and said front wall has a saddle, said arched cut and said saddle forming an aperture through which said sleeve of said optical subassembly passes.

7. The optical transceiver of claim 1,
wherein said metal cover provides a front portion assembled with said optical receptacle and a rear portion assembled with said frame.

8. The optical transceiver of claim 7,
wherein said front portion provides a tab extending forward and said optical receptacle provides a step with an opening, and said rear portion provides an opening and said frame provides a projection, and
wherein said rear portion of said metal cover causes a downward force to push said ceiling downward by mating said tab with said opening of said step and said projection of said frame with said opening of said rear portion of said metal cover.

\* \* \* \* \*